United States Patent
Perrington et al.

[11] Patent Number: 5,176,779
[45] Date of Patent: Jan. 5, 1993

[54] FAN-OUT PADDING USING A HOT MELT ADHESIVE

[75] Inventors: Kenneth J. Perrington; James M. DeWanz, both of Woodbury, Conn.

[73] Assignee: Minnesota Mining and Manufacturing Company, Saint Paul, Minn.

[21] Appl. No.: 654,382

[22] Filed: Feb. 12, 1991

Related U.S. Application Data

[63] Continuation of Ser. No. 237,544, Aug. 29, 1988, abandoned.

[51] Int. Cl.$^5$ ............................ B32B 31/00; C09J 5/00
[52] U.S. Cl. ...................... 156/289; 156/305; 156/309.6; 428/906; 524/77; 524/489
[58] Field of Search ............ 156/305, 289, 309.6; 428/906; 524/77, 489; 412/8, 900; 282/24 R, DIG. 2

[56] References Cited

U.S. PATENT DOCUMENTS

| | | | |
|---|---|---|---|
| 3,619,225 | 11/1971 | Demmig et al. ............... | 106/287 |
| 3,717,366 | 2/1973 | Decker ............................ | 412/900 |
| 3,723,371 | 3/1973 | Campbell et al. .............. | 524/489 |
| 3,860,549 | 1/1975 | Sekmakas ...................... | 260/29.6 |
| 3,960,638 | 6/1976 | Ogata et al. ................... | 156/305 |
| 3,963,553 | 6/1976 | Kiritani et al. ................. | 156/305 |
| 3,970,500 | 7/1976 | Ishizuka et al. ................ | 156/305 |
| 3,970,501 | 7/1976 | Miyamoto et al. .............. | 156/305 |
| 3,989,658 | 11/1976 | Hokama et al. ................ | 524/489 |
| 4,041,193 | 8/1977 | Hayashi et al. ................ | 427/151 |
| 4,105,611 | 8/1978 | Orth, Jr. ......................... | 260/27 |
| 4,217,162 | 8/1980 | Glanz et al. .................... | 156/305 |
| 4,230,514 | 10/1980 | Becker et al. ................. | 156/305 |
| 4,283,317 | 8/1981 | Murphy et al. ................. | 260/27 R |
| 4,345,349 | 8/1982 | Flanagan ....................... | 412/5 |
| 4,404,299 | 9/1983 | DeCroix ......................... | 524/77 |
| 4,413,080 | 11/1983 | Blake ............................. | 524/187 |
| 4,497,941 | 2/1985 | Aliani et al. .................... | 526/331 |
| 4,960,295 | 10/1990 | Bodouroglou ................ | 281/15.1 |

FOREIGN PATENT DOCUMENTS

| | | |
|---|---|---|
| 3501594 | 7/1986 | Fed. Rep. of Germany . |
| 2222416 | 10/1974 | France . |
| 49-99635 | 9/1974 | Japan . |
| 52-30839 | 3/1977 | Japan . |
| 53-12844 | 5/1978 | Japan . |
| 53-12845 | 5/1978 | Japan . |
| 58-1228 | 1/1983 | Japan . |
| 121202 | 4/1982 | Poland . |
| 1253666 | 11/1971 | United Kingdom . |
| 1263510 | 2/1972 | United Kingdom . |
| 1592358 | 7/1981 | United Kingdom . |
| 2167074 | 10/1985 | United Kingdom . |

*Primary Examiner*—John J. Gallagher
*Attorney, Agent, or Firm*—Gary L. Griswold; Walter N. Kirn; Dale A. Bjorkman

[57] ABSTRACT

Adhesively edge-padded stack of carbonless copy paper better separates upon fanning into collated sets when a thin layer of hot-melt adhesive is used for the edge-padding. As in the prior art, the outer surfaces of each set should have a release coating such as a fluorocarbon. The layer of hot-melt adhesive includes, by weight:
20–50% thermoplastic copolymer,
15–50% tackifying resin, and
20–60% wax having a melting point of at least 60° C.

As soon as the adhesive has cooled below its softening point, the stack can be fanned, thus breaking it into sets. Fanning can usually be performed within 45 seconds, because there is no need to wait for the adhesive to dry as has been necessary with the aqueous adhesives that have been used in the prior art. Preferably at least 20% by weight of the adhesive is a paraffin wax that is [α] $C_{35}$–$C_{70}$ substantially straight-chain hydrocarbon.

7 Claims, 1 Drawing Sheet

FAN-OUT PADDING USING A HOT MELT ADHESIVE

This is a continuation of application Ser. No. 07/237,544 filed Aug. 29, 1988, now abandoned.

BACKGROUND OF THE INVENTION

1. Field of the Invention

The invention particularly concerns a method of adhesively edge-padding a stack of collated carbonless copy paper so that upon being fanned out, the stack spontaneously separates into individual sets, each of which is adhesively bonded together at one edge. The method can also be used for edge-padding a stack of ordinary paper that has been collated into sets. Both the resulting edge-padded stacks and the hot-melt adhesive used for the edge-padding are believed to be novel.

2. Description of the Related Art

U.S. Pat. No. 4,217,162 (Glanz et al.) says: "For many years carbonless copy paper has been made into form sets from a lift of collated sheets by applying an adhesive to one edge of the lift, drying the padded edge and fanning the lift into individual form sets. British Pat. No. 1,263,510 discloses an improvement in edge-padding performance by using as the adhesive a mixture of an aqueous solution of a gelatin derivative and an aqueous emulsion of a polymer. Further improvements in edge-padding are taught in U.S. Pat. Nos. 3,960,638; 3,963,533; 3,970,500; 3,970,501; and 4,041,193 where a naphthalene sulfonic acid-formaldehyde condensate is used in an edge-padding adhesive formulation in various combinations with materials such as water-soluble polymers, water-soluble binders, water-soluble metal salts, polymer emulsions, surface active agents and latexes. Japanese Pat. Publication Nos. 12844/1978 and 12845/1978 teach the use of a surface active agent with an aqueous solution of a synthetic polymeric adhesive, respectively, in an edge-padding adhesive formulation. Japanese Pat. Disclosure No. 99635/1974 teaches an aqueous edge-padding adhesive composition comprising a vinyl acetate/maleic acid copolymer and various alcohols" (col. 1, lines 19-43).

Like the adhesives mentioned in the foregoing quotation, the Glanz patent employs a water-based adhesive but says that better bonding within a set and better separation between sets is attained when the edge of the lift or stack is pretreated with water or certain aqueous solutions before applying the adhesive. One of the aqueous solutions that is said to be useful is a prior art edge-padding adhesive, namely an acrylic latex adhesive which apparently is used in all of the examples. The Glanz patent says: "Selective adherence occurs because the adhesive bonds the coated surfaces of the collated form, but not the uncoated surfaces" (col. 2, lines 29-31). Except for that statement, neither the Glanz patent nor any of the above-cited patents and publications explains why the adhesive adheres only to the coated surfaces.

Chem Abstracts, Vol. 99, Abstract 185057J (1983) reports that Japanese Pat. Application 81/160,004 (Fuchigami; also PCT Int. Application WO 83 01,228) uses an aqueous latex adhesive to bond the edge of a stack of carbonless or no-carbon paper that can be fanned apart into individual sets. The abstract says that "the outside surfaces of the copying paper set are coated with water resistant and/or water repellent substances to prevent adhesion between sets."

Several adhesives are currently marketed specifically for the purpose of edge-padding collated stacks of carbonless copy paper to be fanned into sets. These include "Fanapart High-strength Padding Adhesive" from Appleton Papers, Inc., Appleton, Wis.; "Mead Fan-Apart Adhesive" from the Fine Paper Division of Mead Paper Corp., Chillicothe, Ohio; "Nashua Expressway Fan-Apart Adhesive" from Nashua Corp; and "Fan-out Padding Adhesive" from 3M. Each of these is an aqueous adhesive, and the container of each instructs users to apply the adhesive by brushing, although it is understood that some users apply it by spraying and a few, by dipping. Brushing is usually done by hand, and considerable skill is required to attain a high degree of confidence that the edge-padded stack will separate correctly. Even if there were no failures, the brushing operation is messy and pollutes the atmosphere with materials that can have unpleasant odors. Spraying and dipping involve comparable problems.

In collated carbonless copy paper currently on the market, at least one of the outer faces of each set typically has been treated with a silicone or a fluorocarbon which counteracts curling that otherwise would result from the functional coating on the other surface of that sheet. That treatment also acts as a release agent for the edge-padding adhesive and can allow the adhesively edge-padded stack to separate into sets upon fanning, assuming that the edge-padding adhesive is not so thick as to create bridges that would inhibit such separation. Failures to separate are quite common.

The instructions on the Appleton container say that the stack can usually be fanned apart after 30 minutes and that complete drying and bonding occurs within two hours after applying. The Nashua instructions suggest drying for at least one hour before fanning. The only drying time in the Mead instructions is "at least three to four hours if sets include tag or ledger stock, or crash-imprinting is planned."

Sets of carbonless copy paper which have been edge-padded using aqueous adhesives are inevitably wrinkled at the adhesive bond and, when an individual sheet is removed, it always experiences some delamination at the adhesive edge.

3. Other Art

Hot-melt adhesives have been widely used to bind books, but the collated set of sheets that make up each book is always separated before the edge adhesive is applied. In U.S. Pat. No. 4,105,611 (Orth), after the sheets to be bound are stacked, a "weight bar contacts the sheets along a line which is spaced back a short distance from the sheet edges themselves, so that the edges are somewhat flared apart. Such flaring permits the adhesive to flow between the sheets for a short distance" (col. 2, lines 31-35). The hot melt adhesive of the Orth patent is comprised of, by weight, 30-40% ethylene/vinyl acetate (EVA) copolymer, 25-35% wax (preferably a paraffin wax), 20-40% of a modified rosin, and 10-30% of a fluid tackifier. Both of the latter two are considered to be tackifying resins.

West German Offenlegungsschrift DE 3,501,594 A1 (Koller; laid open Jul. 24, 1986) binds books with an EVA copolymer compounded with a tackifying resin and preferably also with either ethylene/butyl acrylate copolymer or a polyolefin. See also U.K. Pat. Application GB 2,167,074A (Tizzard et al.; printed May 21, 1986), the book binding adhesive of which likewise is primarily a mixture of segmented EVA copolymer and tackifying resin and may include waxes, e.g., petroleum waxes such as paraffin or microcrystalline waxes.

For a detailed discussion of adhesives based on EVA copolymers, see U.S. Pat. No. 4,497,941 (Aliani et al.) that says: "Conventionally, a hot melt coating formulation contains a polymer, a resin and a wax, a typical composition comprising 25% EVA, 25% resin and 50% wax" (col 6, lines 35-38). Aliani says that the wax "is present to reduce viscosity" and "also acts as an extender and a wetting agent and in some compositions as a set time improver" (col. 1, lines 41-46). Aliani avoids the wax by employing a new EVA copolymer involving the incorporation of a "chain transfer agent into the EVA copolymer. For example, when isobutylene is employed the product will be effectively an ethylene/-vinyl acetate/isobutylene terpolymer. As used herein, the terms 'EVA', 'EVA copolymer' and 'ethylene vinyl acetate copolymer' include polymers containing such additional comonomers" (col. 8, lines 21-28). Aliani also describes a large number of prior EVA-based hot-melt adhesives that do employ wax.

SUMMARY OF THE INVENTION

The invention concerns an improved method for adhesively padding a collated stack of paper sheets so that fanning separates the stack into individual sets. The method of the invention is faster, more convenient, and more reliable than is any prior method. Briefly, the method of the invention includes the steps of a) treating at least one outer face of each set of the sheets with release agent, b) applying a uniformly thick preformed layer of hot-melt adhesive to an edge of the stack, which adhesive comprises mutually compatible materials as follows, by weight:

20-50% thermoplastic resin, 15-50% tackifying resin, and 20-60% wax having a melting point of at least 60° C., said wax comprising at least 33% by weight of a paraffin wax that is a $C_{35}$-$C_{70}$ substantially straight chain hydrocarbon having a melting point of at least about 84° C., c) heating the adhesive to a temperature at which its viscosity is between 200 and 20,000 cps, and d) continuing to heat the applied adhesive until it flows between adjacent sheets of the stack.

As soon as the adhesive has cooled below its softening point, the stack can be fanned, thus breaking it into sets. Fanning can usually be performed within 45 seconds, because there is no need to wait for the adhesive to dry as had been necessary in the prior art. The stack breaks into sets, because the adhesive does not adhere to the treated outer face or faces of each set but has penetrated into the other faces of each set to adhere adjacent faces together.

In step a), both of the outer faces may be treated with release agent to make it easier to separate the stack into sets upon fanning.

To ensure that fanning breaks the adhesively edge-padded stack into sets, at least 20% by weight of the adhesive should be a paraffin wax that is $C_{35}$-$C_{70}$ substantially straight-chain hydrocarbon. Other paraffin waxes as well as waxes that are not paraffin may also be present as long as the total wax content does not exceed about 60% by weight of the hot-melt adhesive. The breaking into sets is further enhanced when the $C_{35}$-$C_{70}$ content of the paraffin wax has a melting point of at least about 80° C.

A paraffin wax that has a $C_{35}$-$C_{70}$ substantially straight-chain hydrocarbon content of about 99% is commercially available as "Shellwax S 700" from Shell Chemical Co. It is believed to have about one methyl branch per molecule and a molecular weight (GPC) from 500 to 750, usually about 600-650. "Shellwax S-400" is a mixture of waxes, and it is believed that about 40% of the mixture is $C_{35}$-$C_{70}$ substantially straight-chain hydrocarbon having about one methyl branch per molecule and a molecular weight (GPC) from 500 to 750. "Shellwax S 600" is believed to be substantially identical to "Shellwax S-700" but has a yellow color instead of white.

Preferably at least 30% by weight of the hot-melt adhesive is wax. Otherwise the adhesive may be so strong that the stack might not reliably separate into sets upon being fanned. When the wax content is much above 60%, the adhesive may be too weak to keep individual sets intact during fanning and when they are later imprinted. In addition to Shell Chemical Co., useful waxes are commercially available from Witco and from the Bareco Division of Petrolite.

To ensure that fanning breaks the edge-padded stack into sets, the weight ratio of the thermoplastic resin to tackifier resin should be at least 0.7 to 1.0 and not more than 3 to 1, preferably at least 1 5 to 1 and not more than 2.5 to 1.

The layer of hot-melt adhesive applied in step b) preferably is first slit to a width equal to the width of the edge of the collated stack of sheets that is to be edge-padded, and a piece can be cut from the layer to match the height of the stack.

Almost the entire layer of adhesive that is applied in step b) should flow between the sheets so that very little adhesive bridges the sets, because such bridges could inhibit separation between collated sets upon fanning the stack. When the original thickness of the adhesive layer exceeds 0.4 mm, it can take an uneconomically long period of time for this to happen. On the other hand, the original thickness of the adhesive preferably is great enough to permit the adhesive layer to be wound upon itself without a backing and, after storage and shipment at ordinary room temperatures, unwound and handled without breaking. To do this may require the thickness of the adhesive to be greater than 0.1 mm. Experimentation has shown that a long roll of a preferred hot-melt adhesive of the invention can be stored for long periods of time at ordinary room temperatures and then unwound, whether or not it has a backing. The avoidance of a backing both saves its cost and the time and trouble of its disposal.

During steps c) and d), the edge of the stack preferably is compressed under at least 30 psi (207 kPa) in order to slow the flow of adhesive into the stack, thus giving time for the adhesive to penetrate into and create a good bond between individual sheets within each set. When the collated stack is of carbonless copy paper, a compression of more than about 50 psi (345 kPa) might rupture the dye-containing capsules. When there are no capsules to rupture, the applied pressure can be appreciably higher.

The viscosity of the hot-melt adhesive at the temperature to which it is heated in steps c) and d) of the novel method preferably is between 1000 and 10,000 cps. If the heating were to reduce the viscosity to substantially less than 1000 cps, the adhesive might flow past the edges of the individual sheets without penetrating into their pores, thus failing to create an adequate bond between sheets within sets. On the other hand, if its viscosity were substantially greater than 10,000 cps during steps c) and d), the adhesive might flow into the stack so slowly as to make the method uneconomical. Preferably the viscosity of the adhesive during steps c) and d) is sufficiently low to permit those steps to be completed within about 30 seconds.

The melting point of the hot-melt adhesive should be sufficiently high that the adhesive layer remains tack-free at any temperature to which it might be exposed in storage and shipment, and for the same reason, the melting point of the wax preferably is at least 70° C. On the other hand, the melting point of the adhesive should be low enough (preferably between 120° and 165° C.) to permit the temperature during steps c) and d) to be reasonably low, both for safety and energy conservation.

When the thermoplastic resin content of the hot-melt adhesive is much less than 20% or more than 50% by weight, the adhesive may be too weak to hold together the sheets of each set during fanning. The thermoplastic resin of the hot-melt adhesive preferably is an ethylene/vinyl acetate (EVA) copolymer having a melt index between 150 and 1000. Other suitable thermoplastic resins include copolymers of ethylene with acrylates or acrylic acid, polyamides, and ethylene/propylene/-vinyl acetate terpolymers, provided that the melting point of the thermoplastic resin permits the hot-melt adhesive to have a viscosity of from 1000 to 10,000 cps at the temperature of steps c) and d). Characteristic of these thermoplastic resins is that each has a segment with high polarity or high hydrogen bonding Hansen parameter.

Preferred EVA copolymers have a vinyl acetate (VA) content of from 15 to 40% by weight, more preferably from 25 to 30%. When the VA content is outside of the 15-40% range, the hot-melt adhesive tends to have inferior adhesion so that individual sheets of a set might separate prematurely. The melt index of the EVA copolymer preferably is from 300 to 700. When the melt index of the EVA copolymer has been much below 300, the hot-melt adhesive has been too viscous at desirable application temperatures to permit steps c) and d) to be completed quickly. When the melt index of the EVA copolymer has been much above 700, the hot-melt adhesive has had undesirably low viscosity at desirable application conditions.

A preferred EVA copolymer is "UL 8710" from Exxon Chemicals and has a VA content of 28% and a melt index of 500. It is believed to be what is called "a new EVA copolymer" in the above-discussed Aliani 4,497,941 by virtue of a chain transfer agent such as propylene or isobutylene that provides branching. Other useful EVA copolymers from Exxon Chemicals include "XS-41," and "XS-49," both of which have VA contents of 28%. It is believed that XS-41 and XS-49 employ (like "UL-8710") a chain transfer agent and are branched. Their melt indexes are 190 and 60, respectively. Another EVA copolymer from Exxon, "UL-7710," has the same 28% VA content and melt index as "UL-8710" but is believed to be linear or unbranched. Adhesives films of the invention made using "UL 7710" instead of "UL 8710" tend to afford equally good fan-out properties but not as good adhesion between individual sheets of a set.

The tackifying resin preferably is of the type commonly known as terpene resin. When the tackifying resin provides either less than 15% or more than 35% by weight of the hot-melt adhesive, the adhesion to paper may be undesirably low. Preferred terpene tackifying resins are substantially saturated hydrocarbons, especially cycloaliphatics, because these tend to have better compatibility with the wax. Particularly useful tackifying resins that are commercially available include "Arkon" P-70, M-90, P-90 and M-100 from Arakawa Chemical (U.S.A.) Inc. and "HM 105", "Piccofyn A135", and "Piccotex 75" from Hercules, all of which are cycloaliphatic.

To provide good mutual compatibility between the thermoplastic resin, the tackifying resin, and the wax, the Hansen dispersion parameter of each of the tackifying resin and the wax should match that of one component of the thermoplastic resin. When the thermoplastic resin is an EVA copolymer, the Hansen dispersion parameter of each of the tackifying resin and the wax should match that of the ethylene moiety of the EVA copolymer.

DETAILED DISCLOSURE

Testing indicates that the method of the invention is more tolerant of unevenness of the edge of the stack than are prior edge-padding methods. This improvement is attributed in part to the controlled weakness of the hot-melt adhesive and in part to the uniform thickness of the layer of adhesive to be applied in step b). That thickness preferably is at least 0.15 mm. At much less than 0.15 mm, the edge of the stack would need to be unusually smooth to assure adequate bonding within individual sets.

The release material of step a) of the above-outlined edge-padding method preferably is a fluorocarbon. Useful fluorocarbons include FC 808, FC 829, and FC 835 from 3M which are currently in commercial use for coating the outer surfaces of sets of carbonless copy paper, both to counteract cupping or curling and to release the edge-padding adhesive. As has been recognized in such use, these fluorocarbons do not prevent the treated surfaces from accepting ink applied either by printing or with a pen. It is believed that this result is attained because the fluorocarbon penetrates into the surface of the paper (and thus prevents the adhesive from doing so) but does not form a film at the surface of the paper that would prevent ink from adhering to that surface.

When the sheets of the stack are carbonless copy paper, the surface energy of the edge-padding adhesive preferably is less than 40 ergs/cm$^2$ so that the adhesive can wet and bond to the inner faces of the sets. The surface energy of the adhesive preferably is at least 30 ergs/cm so that it does not bond to the outer surfaces of the sets.

The hot-melt adhesive should have a tensile strength (ASTM D638M-84) of at least 600 kPa (Metric) and not more than 6000 kPa. Higher tensile strengths might inhibit separation between sets upon fanning. The elongation should be at least 20%; otherwise sheets within the sets might separate during fanning or when being imprinted.

THE DRAWING

The invention may be more easily understood in reference to the drawings in which.

Figure 1:
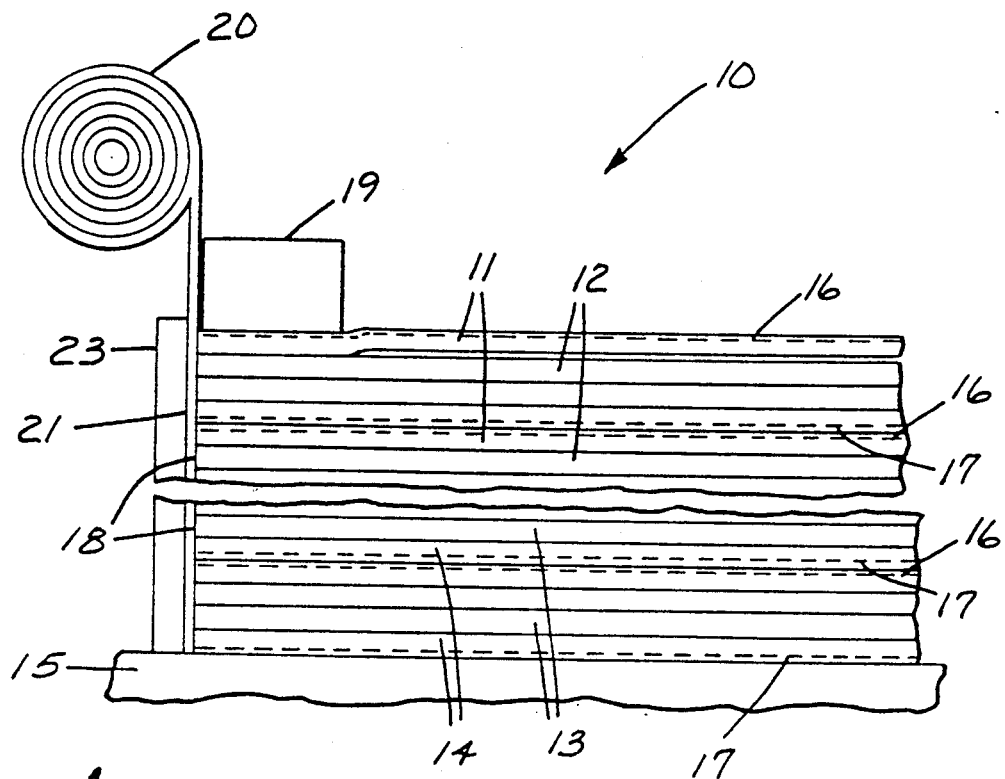
FIG. 1 is a schematic elevation of the edge padding of a collated stack of carbonless copy paper to permit the stack to separate into individual sets upon being fanned.

FIG. 1 shows a stack 10 of 4-part carbonless copy paper sheets 11 (coated back=CB), 12 (coated front and back=CFB), 13 (CFB) and 14 (coated front=CF) resting on a table 15. Each CB coating contains rupturable capsules which when ruptured release reagents to produce a color-changing reaction at the adjacent CF coating.

Figure 3:
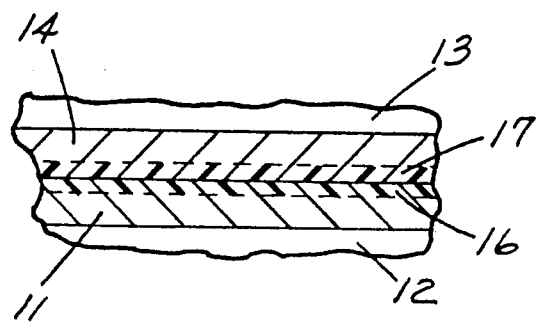
FIG. 3 is a fragmentary cross-section of the stack of FIG. 1, enlarged to show detail.

The outer, uncoated faces of the top sheet 11 and the bottom sheet 14 of each 4-part set have been treated with release agent 16 and 17, respectively (as best seen in FIG. 3). A flat plate (not shown) has been used to afford a smooth edge 18 of the stack 10. After compressing the edge 18 with a steel bar 19, a roll 20 of hot-melt adhesive is partially unwound so that a layer 21 of the adhesive is coextensive with the edge. A heated plate 23 then presses the adhesive layer 21 against the edge, thus melting the adhesive and causing it to flow into the stack 10 to produce an adhesively edge-padded stack of sheets of the invention.

Figure 2:
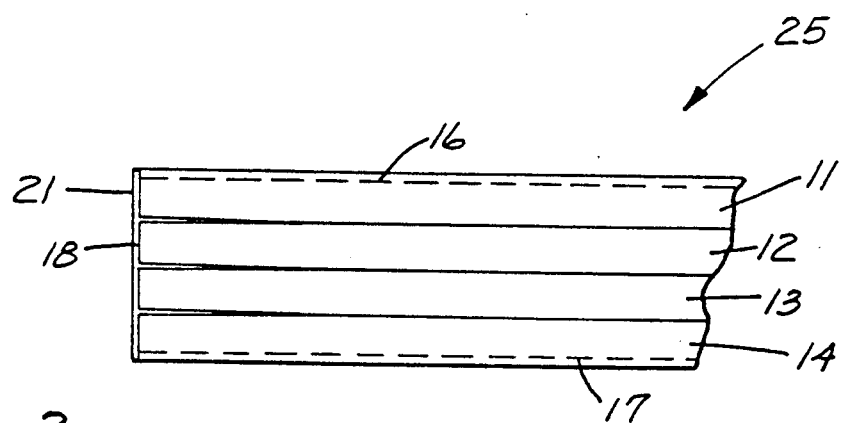
FIG. 2 is a fragmentary schematic elevation of one 4-part set that has been adhesively edge-padded as illustrated in FIG. 1.

After the adhesive has cooled, the stack is fanned to separate it into 4-part sets. A fragment 25 of one of the sets is shown in FIG. 2. Although a very thin skin of the adhesive layer 21 may remain as shown in FIG. 2, virtually all of the adhesive has flowed between the sheets of the stack.

Fan-Out Rating

A stack of sets of collated sheets that has been edge-padded is tested for fan-out into sets as follows:

1) While gripping the edge-padded end of the stack with one hand and the unpadded end with the other, bend the stack into a "U" shape. Then while holding the stack horizontally, release the padded end, allowing that end to droop downward. If complete fan-out has been accomplished, rate as a 3.5; if not, continue.

2) Place the stack on a flat surface with fingers one inch (2.5 cm.) back from the edge-padded end on top and thumbs under the corners, and simultaneously fan upwards on both corners of the edge-padded end. If complete fan-out has been accomplished, rate as 3.0; if not, continue.

3) Place on a flat surface with fingers on top and the thumbs under the edge-padded end approximately 3 inches (7.6 cm) from the corners of the edge-padded end, and simultaneously fan upwards once. If complete fan-out has been accomplished, rate as 2.5; if not, continue.

4) Place stack on a flat surface with fingers on top and thumbs under the edge-padded end wherever needed, and simultaneously fan upwards twice. If complete fan-out has been accomplished, rate as 2.0; if not, continue.

5) While holding the stack as in step 4), fan with both thumbs three times wherever needed. If complete fan-out has been accomplished, rate as 1.5; if not, continue.

6) While holding the stack as in step 4), fan with the thumbs six more times wherever needed. If complete fan-out is accomplished, rate as 1.0; if not continue.

7) While holding the stack as in step 4) continue to fan with the thumbs wherever needed. If complete or partial fan-out can be accomplished, rate as 0.5; if not, rate as 0.

Generally, the carbonless copy paper industry will accept a Fan-Out Rating of 2.0, but a higher value would be preferred.

Bond Strength

The strength of the adhesive bond between two individual sheets of a set of carbonless copy paper is tested using a paper-spring-tension measurement device, the Chatillon "Gauge-R." With the unpadded end of one sheet in the clamp, the unpadded end of the other sheet is gripped by one thumb and fingers at the sides and pulled slowly until the bond fails. Measurements are made between the coated front and a coated front and back sheet (CF/CFB), between two coated front and back sheets (CFB/CFB), and between a coated front and back and the coated back sheet (CFB/CB). Typically, the lowest Bond Strength in a set is CFB/CFB.

When the Bond Strength exceeds 10 units (10 hectograms of force across a width of 8.5 inches (21.6 cm)), a set of sheets should withstand premature separation in any ordinary printing operation, including crash printing or perforating. The maximum Bonding Strength indicated by the measurement device is 45 units (10 pounds or 45 hectograms of force).

In the examples, all parts are by weight.

EXAMPLE 1

A hot-melt adhesive (having a viscosity at 121° C. of 3000 cps) was prepared from:

40 parts of an EVA copolymer having a VA content of 28% and a melt index of 500 ("UL 8710" from Exxon Chemicals), 20 parts of a terpene tackifying resin that is substantially entirely cycloaliphatic and has a melting point of about 75° C. ("Piccotex 75" from Hercules), and 40 parts of paraffin wax having a melting point of about 84° C. ("Shellwax S-700" from Shell Chemical).

After these ingredients had been mixed for 2 hours at 115° C., the mixture was extruded at 115° C. onto an endless plastic belt having a silicone release surface. The extruded layer had a uniform thickness of 0.28 mm and a width of 50 cm. The belt was carried over a succession of heated rolls at decreasing temperatures in order to cool the layer to room temperature over a period of about two minutes, thus avoiding rapid crystallization so that the cooled layer was quite flexible and soft, but tack-free to the touch, and could be handled without any danger of being broken. The cooled layer of hot-melt adhesive was slit to a width of 8.5 inches (21.6 cm) and wound upon itself into roll form from which it was later unwound without difficulty and used to edge-pad a stack of collated 4-part carbonless copy paper sheets, each 8.5 by 11 inches (21.6×27.9 cm), as illustrated in FIG. 1 of the drawing. Individual sheets of the stack were blue/purple image (from 3M) and had basis weights of 16.5 lb. CB, 18 lb. CFB's, and 17 lb. CF [62g/m$^2$ CB, 68 g/m$^2$ CFB's, and 64 g/m$^2$ CF].

A flat plate was used to provide a smooth edge. While that edge of the stack was being vertically subjected to a pressure of 40 psi (276 kPa), a resistance-heated copper plate which had been preheated to a surface temperature of 121° C. was lightly pressed by hand against the layer of hot-melt adhesive for about 45 seconds. After cooling for about one minute, the vertical pressure was released and the adhesively edge-padded stack was subjected to Fan-out testing as described above and received a rating of 2.5.

The Bond Strength of the adhesive bond between individual sheets of the edge-padded stack was tested as described above. Results are reported in Table I.

EXAMPLES 2-10

A series of adhesively edge-padded stacks were prepared and tested as in Example 1 except that the hot-melt adhesive had various weights of EVA copolymer and tackifying resin. The amount of the paraffin wax was maintained at 40 parts. Results are in Table I together with results of Example 1. Bond strengths were measured on individual sets which had been separated from the adhesively edge-padded stack during the testing for fan-out.

TABLE I

| Example | EVA (parts) | Tackifier (parts) | Fan-out Rating | Bond Strength (units) | | |
|---|---|---|---|---|---|---|
| | | | | CF/CFB | CFB/CFB | CFB/CB |
| 1 | 40 | 20 | 2.5 | 45 | 45 | 45 |
| 2 | 6 | 54 | 2.0 | 0 | 0 | 0 |
| 3 | 12 | 48 | 2.5 | 3 | 0 | 0 |
| 4 | 18 | 42 | 2.5 | 24.5 | 0 | 39 |
| 5 | 24 | 36 | 3.0 | 40.5 | 9 | 43 |
| 6 | 30 | 30 | 3.0 | 35.5 | 27 | 38.5 |
| 7 | 36 | 24 | 3.0 | 45 | 32 | 45 |
| 8 | 42 | 18 | 2.5 | 42 | 27 | 45 |
| 9 | 48 | 12 | 2.5 | 21 | 3 | 26 |
| 10 | 54 | 6 | 3.0 | 31 | 0 | 12 |

In testing the edge-padded stacks of Examples 1-10 for Bond Strength, each sheet always tore off cleanly with no evidence of tearing or delamination of the paper. In contrast, sheets removed in the measurement device from sets with the prior edge-padding aqueous adhesives always showed surface tearing or delamination near the adhesive edge.

Table I shows decreased Bond Strength both at higher and lower ratios of EVA copolymer and tackifying resin.

EXAMPLES 11-16

A series of edge-padded stacks were prepared and tested as in Example 1 except changing the amount of the paraffin wax while keeping a ratio of 2:1 between the EVA copolymer and tackifying resin and keeping total EVA copolymer, tackifying resin and wax at 100 parts. Example 12 is a repeat of Example 1. Test results are in Table II.

TABLE II

| Example | Wax (parts) | Fan-Out Rating | Bond Strength (units) | | |
|---|---|---|---|---|---|
| | | | CF/CFB | CFB/CFB | CFB/CB |
| 11 | 30 | 1.0 | 45 | 45 | 45 |
| 12 | 40 | 2.5 | 45 | 39 | 45 |
| 13 | 45 | 3.0 | 45 | 32 | 45 |
| 14 | 50 | 3.0 | 45 | 30 | 45 |
| 15 | 55 | 3.0 | 45 | 28 | 45 |
| 16 | 60 | 3.0 | 45 | 0 | 45 |

EXAMPLES 17-20

A series of hot-melt adhesives were prepared and used as in Example 1 except using EVA copolymers of various VA contents. Example 18 is a repeat of Example 1. Although the EVA copolymer of Example 18 is believed to be branched, those used in Examples 17, 19 and 20 are believed to be linear. Results are shown in Table III.

TABLE III

| Example | EVA VA % | Copolymer Melt Index | Fan-Out Rating | Bond Strength (units) CFB/CFB |
|---|---|---|---|---|
| 17 | 17 | 400 | 3.0 | 10 |
| 18 | 28 | 500 | 3.0 | 30 |
| 19 | 33 | 700 | 1.5-2.0 | 22 |
| 20 | 40 | 2500 | 1.0 | 7 |

EXAMPLES 21-53

A series of edge-padded stacks were prepared and tested as in Example 1 except that the hot-melt adhesive was varied by replacing all or part of the EVA copolymer with one or both of the EVA copolymers "XS-41" and "XS-49" from Exxon Chemicals, both of which have a VA content of 28%, but their melt indexes are 190 and 60, respectively. Some of the Examples 21-53 are repetitions, and both of Examples 37 and 38 repeat Example 1. Test results are reported in table IV. Examples 37 and 38 repeat Example 1. Test results are reported in Table IV.

TABLE IV

| Ex. | EVA Copolymer (%) | | | Tensile Str. (kPa) | Elong (%) | Visc. (100° C.) | Visc. (150° C.) | Fan-out Rating | Bond Strength (units) | | |
|---|---|---|---|---|---|---|---|---|---|---|---|
| | XS-49 | 8710 | XS-41 | | | | | | CB/CFB | CFB/CFB | CFB/CF |
| 21* | 100 | 0 | 0 | 633. | 59. | 11740 | 2990 | 2.0 | 45 | 40 | 45 |
| 22 | 90 | 10 | 0 | 643. | 45. | 7190 | 1360 | 3.0 | 45 | 35 | 44 |
| 23 | 80 | 20 | 0 | 643. | 44. | 10760 | 2600 | 0.5 | 35 | 18 | 39 |
| 24 | 75 | 25 | 0 | 671. | 61. | 9530 | 2020 | 1.5 | 40 | 25 | 40 |
| 25 | 70 | 30 | 0 | 662. | 53. | 17100 | 2590 | 3.0 | 45 | 45 | 45 |
| 26 | 60 | 40 | 0 | 660. | 56. | 11610 | 2590 | 3.0 | 45 | 45 | 45 |
| 27 | 50 | 50 | 0 | 645. | 38. | 4780 | 1080 | 3.0 | 35 | 30 | 35 |
| 28 | 50 | 50 | 0 | 650. | 48. | 7940 | 1080 | 2.5 | 45 | 40 | 18 |
| 29 | 50 | 50 | 0 | 619. | 38. | 7440 | 1530 | 2.5 | 45 | 40 | 18 |
| 30 | 50 | 50 | 0 | 653. | 58. | 5120 | 1020 | 2.5 | 45 | 30 | 35 |
| 31 | 50 | 50 | 0 | 674. | 54. | 8270 | 1340 | 2.5 | 45 | 35 | 45 |
| 32 | 40 | 60 | 0 | 637. | 49. | 7532 | 1640 | 3.0 | 45 | 30 | 44 |
| 33 | 30 | 70 | 0 | 645. | 38. | 6410 | 1430 | 2.0 | 45 | 45 | 45 |
| 34 | 25 | 75 | 0 | 550. | 27. | 5660 | 1250 | 2.5 | 45 | 45 | 45 |
| 35 | 20 | 80 | 0 | 624. | 39. | 4540 | 1040 | 2.5 | 45 | 32 | 45 |
| 36 | 10 | 90 | 0 | 649. | 23. | 3670 | 920 | 2.0 | 45 | 25 | 15 |
| 37 | 0 | 100 | 0 | 691. | 48. | 4620 | 980 | 2.5 | 45 | 42 | 45 |
| 38 | 0 | 100 | 0 | 671. | 51. | 4500 | 990 | 2.5 | 45 | 43 | 45 |
| 39 | 0 | 90 | 10 | 673. | 49. | 4350 | 1030 | 3.0 | 45 | 30 | 45 |
| 40 | 0 | 80 | 20 | 632. | 42. | 4250 | 950 | 1.5 | 45 | 40 | 35 |
| 41 | 0 | 75 | 25 | 566. | 38. | 4220 | 570 | 3.0 | 45 | 45 | 45 |
| 42 | 0 | 70 | 30 | 622. | 41. | 4340 | 920 | 2.0 | 45 | 33 | 45 |
| 43 | 0 | 60 | 40 | 649. | 45. | 5480 | 1370 | 2.5 | 45 | 30 | 44 |
| 44 | 0 | 50 | 50 | 623. | 33. | 3300 | 610 | 2.5 | 45 | 32 | 45 |

TABLE IV-continued

| Ex. | EVA Copolymer (%) | | | Tensile Str. (kPa) | Elong (%) | Visc. (100° C.) | Visc. (150° C.) | Fan-out Rating | Bond Strength (units) | | |
| --- | --- | --- | --- | --- | --- | --- | --- | --- | --- | --- | --- |
| | XS-49 | 8710 | XS-41 | | | | | | CB/CFB | CFB/CFB | CFB/CF |
| 45 | 0 | 50 | 50 | 627. | 34. | 5460 | 1220 | 2.5 | 41 | 40 | 44 |
| 46 | 0 | 50 | 50 | 653. | 36. | 3420 | 750 | 2.5 | 45 | 35 | 32 |
| 47 | 0 | 50 | 50 | 605. | 43 | 4240 | 970 | 2.5 | 45 | 36 | 30 |
| 48 | 0 | 40 | 60 | 665. | 44. | 6320 | 1130 | 2.5 | 45 | 36 | 45 |
| 49 | 0 | 30 | 70 | 657. | 45. | 5110 | 1370 | 2.5 | 45 | 37 | 41 |
| 50 | 0 | 25 | 75 | 650. | 47. | 4634 | 1220 | 3.0 | 45 | 30 | 45 |
| 51 | 0 | 20 | 80 | 701. | 54. | 6890 | 1460 | 2.5 | 45 | 20 | 35 |
| 52 | 0 | 10 | 90 | 647. | 34. | 8010 | 1790 | 3.0 | 45 | 45 | 45 |
| 53* | 0 | 0 | 100 | 540. | 26. | 8730 | 1660 | 3.0 | 45 | 20 | 25 |

*Application time of Examples 21 and 53 in excess of 7 min.

EXAMPLES 54-56

These hot-melt adhesives were made and tested as in Example 1, differing therefrom by substituting the EVA copolymer "UL-7710" for "UL-8710" and by substituting mixtures of the paraffin wax "Shellwax S-200" for part of the "Shellwax S-700". "Shellwax S-200" is a substantially straight-chain paraffin wax having a melting point of about 60° C. The wax contents and test results are in Table V.

TABLE V

| Example | S-700 | S-200 | Fan-Out Rating | Bond Strength (units) CFB/CFB |
| --- | --- | --- | --- | --- |
| 54 | 20 | 20 | 3.5 | 40-45 |
| 55 | 10 | 30 | 0 | 40-45 |
| 56 | 30 | 10 | 2.0 | 40-45 |

The hot-melt adhesive of Example 54 is more difficult to use than is that of Example 1, so that the test results reported in Table V are less likely to be reproducible.

EXAMPLE 57

A hot-melt adhesive was made and tested as in Example 1 except that 40 parts of "Shellwax S-400" were substituted for the "Shellwax S-700". It provided a Fan-out Rating of 3.0 and a Bond Strength (CFB/CFB) of 25 units.

What is claimed is:

1. A method of adhesively edge-padding a stack of sheets to permit the stack to be fanned apart into individual sets, said method comprising the steps of
   a) treating at least one outer face of each set of the sheets with release agent,
   b) applying a uniformly thick preformed layer of hot-melt adhesive to an edge of the stack, which adhesive comprises by weight:
      20-50% thermoplastic copolymer,
      15-50% tackifying resin, and
      20-60% wax having a melting point of at least 60° C., said wax comprising at lest 33% by weight of a paraffin wax that is a $C_{35}$-$C_{70}$ substantially straight chain hydrocarbon having a melting point of at least about 84° C.,
   c) heating the adhesive to a temperature at which its viscosity is between 200 and 20,000 cps, and
   d) continuing to heat the applied adhesive until it flows between the adjacent sheets of the stack.

2. Method as defined in claim 1 wherein: said thermoplastic copolymer is an EVA copolymer having a melt index of from 150 to 1000 and the hydrocarbon tackifying resin is primarily cycloaliphatic.

3. Method as defined in claim 1 wherein said adhesive is heated in step b) to a temperature at which its viscosity is between 1000 and 10,000 cps.

4. Method as defined in claim 3 wherein said adhesive is heated in steps c) and d) to a temperature between 120° and 165° C.

5. Method as defined in claim 1 wherein the thickness of the layer of adhesive applied in step b) is from 0.15 to 0.4 mm.

6. A method of adhesively edge-padding a stack of sheets to permit the stack to be fanned apart into individual sets, said method comprising the steps of
   a) treating at least one outer face of each set of the sheets with release agent,
   b) applying a uniformly thick preformed layer of hot-melt adhesive to an edge of the stack, which adhesive comprises by weight:
      20-50% thermoplastic copolymer,
      15-50% tackifying resin, and
      20-60% by weight of a paraffin wax that is a $C_{35}$-$C_{70}$ substantially straight chain hydrocarbon having a melting point of at least about 84° C., and having about one methyl branch per molecule and a molecular weight from 500 to 750,
   c) heating the adhesive to a temperature at which its viscosity is between 200 and 20,000 cps, and
   d) continuing to heat the applied adhesive until it flows between the adjacent sheets of the stack.

7. The method of claim 6 where the sheets are sheets of carbonless paper.

* * * * *

UNITED STATES PATENT AND TRADEMARK OFFICE
CERTIFICATE OF CORRECTION

PATENT NO. : 5,176,779
DATED : January 5, 1993
INVENTOR(S) : Perrington et al.

It is certified that error appears in the above-identified patent and that said Letters Patent is hereby corrected as shown below:

On title page
item, [75] "Inventors: Kenneth J. Perrington; James M. DeWanz, both of Woodbury, Conn."

should be: --Inventors: Kenneth J. Perrington; James M. DeWanz, both of Woodbury, Minn.--

ABSTRACT, second line from bottom, "[a]" should be --a--.

Col. 4, line 26, "1 5" should be --1.5--.

Col. 11, line 54, "lest" should be --least--.

Signed and Sealed this

Sixteenth Day of November, 1993

Attest:

BRUCE LEHMAN

Attesting Officer    Commissioner of Patents and Trademarks